(12) United States Patent
Koshoffer et al.

(10) Patent No.: US 6,715,983 B2
(45) Date of Patent: Apr. 6, 2004

(54) METHOD AND APPARATUS FOR REDUCING DISTORTION LOSSES INDUCED TO GAS TURBINE ENGINE AIRFLOW

(75) Inventors: John Michael Koshoffer, Cincinnati, OH (US); Kevin Robert Drake, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 203 days.

(21) Appl. No.: 09/965,351

(22) Filed: Sep. 27, 2001

(65) Prior Publication Data

US 2003/0059291 A1 Mar. 27, 2003

(51) Int. Cl.⁷ .............................................. F01D 17/16
(52) U.S. Cl. ...................... 415/1; 415/157; 415/159; 415/193; 415/914; 60/761; 60/765
(58) Field of Search ................... 415/1, 157, 159–161, 415/191, 193, 208.2, 209.1, 914; 60/761, 765

(56) References Cited

U.S. PATENT DOCUMENTS

| | | | |
|---|---|---|---|
| 2,844,001 A | * | 7/1958 | Alford ........................ 415/914 |
| 4,029,433 A | | 6/1977 | Penny et al. |
| 4,183,209 A | * | 1/1980 | Kronogard ................... 415/161 |
| 4,439,104 A | | 3/1984 | Edmonds |
| 4,657,481 A | | 4/1987 | Mowill et al. |
| 4,720,235 A | | 1/1988 | Lachance et al. |
| 4,764,088 A | | 8/1988 | Kapich |
| 4,856,962 A | | 8/1989 | McDow |
| 4,989,406 A | * | 2/1991 | Vdoviak et al. ......... 415/209.1 |
| 5,314,301 A | | 5/1994 | Knight |
| 6,106,234 A | | 8/2000 | Gabbitas |
| 2001/0010798 A1 | * | 8/2001 | Dailey et al. ................ 415/159 |

FOREIGN PATENT DOCUMENTS

DE           390486 A   *  2/1924   .................. 415/914

* cited by examiner

*Primary Examiner*—Christopher Verdier
(74) *Attorney, Agent, or Firm*—Nathan Herkamp; Armstrong Teasdale LLP; Robert B. Reeser, III

(57) ABSTRACT

A vane assembly for a gas turbine engine includes at least one vane that includes a first body, a second body, and a passageway. The first body includes a first sidewall and a second sidewall that are connected at a leading edge and a trailing edge. The passageway extends between the second body and the first body leading edge.

16 Claims, 3 Drawing Sheets

METHOD AND APPARATUS FOR REDUCING DISTORTION LOSSES INDUCED TO GAS TURBINE ENGINE AIRFLOW

BACKGROUND OF THE INVENTION

This application relates generally to gas turbine engines and, more particularly, to guide vane assemblies for gas turbine engines.

At least some known aircraft gas turbine engines include a compressor, a combustor, a turbine, and an augmentor. Airflow entering the compressor is compressed and directed to the combustor where it is mixed with fuel and ignited, producing hot combustion gases used to drive the turbine. As the performance demands of aircraft have increased, performance demands of the engines have also increased. For example, engines are being designed to transition between conventional take-off and landing (CTOL) operations, as well as, short-take and vertical landing (STOVL) operations. Augmentors are used in gas turbine engines to increase thrust as needed in a flight envelope and are located downstream from the turbine.

Augmentors include an inlet vane package that is upstream from a diffusing section of the augmentor. The inlet vane package includes a plurality of turning vanes that extend circumferentially within the engine and are used to facilitate aligning airflow directed towards the augmentor. Airflow discharged from the turbine may be distorted and turning the airflow, known as swing in swirl, with the inlet guide vanes may induce additional distortion into the airflow depending upon engine operation. Furthermore, depending on engine operation, an amount of swing in swirl required of the inlet guide vanes may increase beyond a capability of the guide vanes.

At least some known inlet guide vanes can tolerate up to approximately 30 degrees of swing in swirl before distortion losses caused by the inlet guide vanes may become harmful. However, as an engine transitions between CTOL and STOVL operations, an amount of swing in swirl required of inlet guide vanes may be greater than 30 degrees. More specifically, highly distorted flow induced during such engine transitions may actually become more distorted after exiting the inlet guide vanes and entering the diffusion portion of the augmentor. Such airflow distortion may cause low velocity wakes or flow separations which over time, may cause potentially harmful or costly flashback, auto-ignition, unpredicted engine performance losses, or even engine stability issues.

BRIEF DESCRIPTION OF THE INVENTION

In one aspect of the invention, a vane assembly for a gas turbine engine is provided. The vane assembly includes at least one vane including a first body, a second body, and a passageway. The first body includes a first sidewall and a second sidewall connected at a leading edge. The passageway extends between the second body and the first body leading edge.

In another aspect, a method for operating a gas turbine engine is provided that facilitates improving performance of the engine. The engine includes an augmentor. The method includes directing airflow towards at least one vane assembly that is upstream from the augmentor and includes a vane first body, a vane second body, and a passageway extending therebetween, directing airflow into the vane assembly passageway, and discharging the airflow from the vane assembly passageway towards the augmentor.

In a further aspect, a gas turbine engine is provided. The engine includes an augmentor and a vane assembly. The vane assembly includes at least one vane that includes a first body portion, a second body portion, and a passageway. The first body portion includes a pair of sidewalls connected at a leading edge. The second body portion includes a first sidewall and a second sidewall connected at a leading edge. The passageway extends between the second body and the first body leading edge, and is configured to discharge air flowing therethrough towards the augmentor.

DETAILED DESCRIPTION OF THE INVENTION

Figure 1:
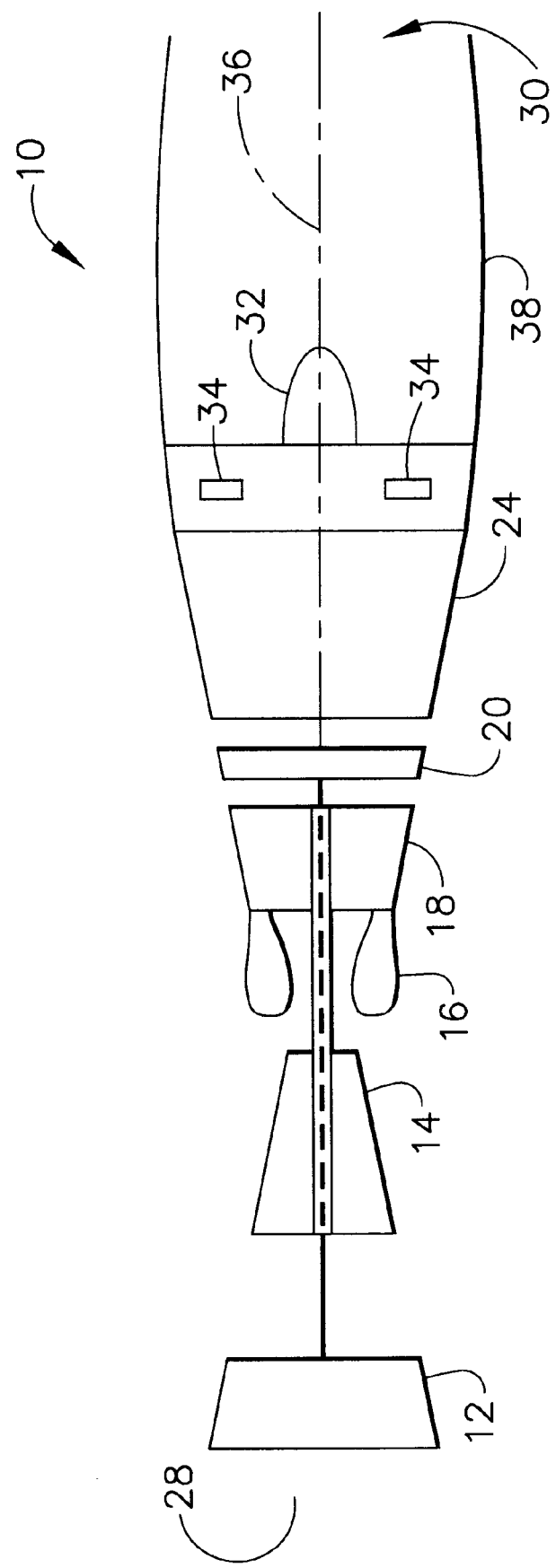
FIG. 1 is schematic illustration of a gas turbine engine.

FIG. 1 is a schematic illustration of a gas turbine engine 10 including a low pressure compressor 12, a high pressure compressor 14, and a combustor 16. Engine 10 also includes a high pressure turbine 18, a low pressure turbine 20, and an augmentor 24. Engine 10 has an intake side 28 and an exhaust side 30. In one embodiment, engine 10 is a CFM 56 engine commercially available from General Electric Corporation, Cincinnati, Ohio.

Exhaust augmentor 24 includes a centerbody 32 and a plurality of guide vanes 34. Centerbody 32 is annular and is disposed co-axially with an engine axis of symmetry 36 and extends aft from turbine 22 into a nozzle 38 of engine 10.

In operation, air flows through fan assembly 12 and compressed air is supplied to high pressure compressor 14. The highly compressed air is delivered to combustor 16. Airflow (not shown in FIG. 1) from combustor 16 drives turbines 18 and 20, and turbine 20 drives low pressure compressor 12.

Figure 2:
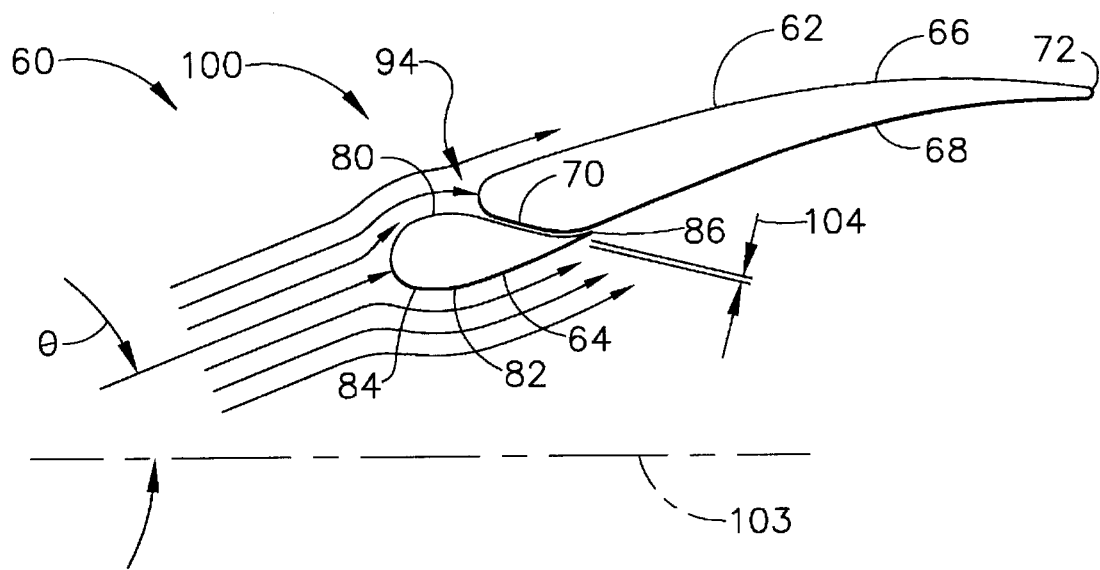
FIG. 2 is a cross sectional view of a guide vane assembly that may be used with the gas turbine engine shown in FIG. 1, and illustrates airflow patterns present during a conventional take-off and landing (CTOL) mode of engine operation.
Figure 3:
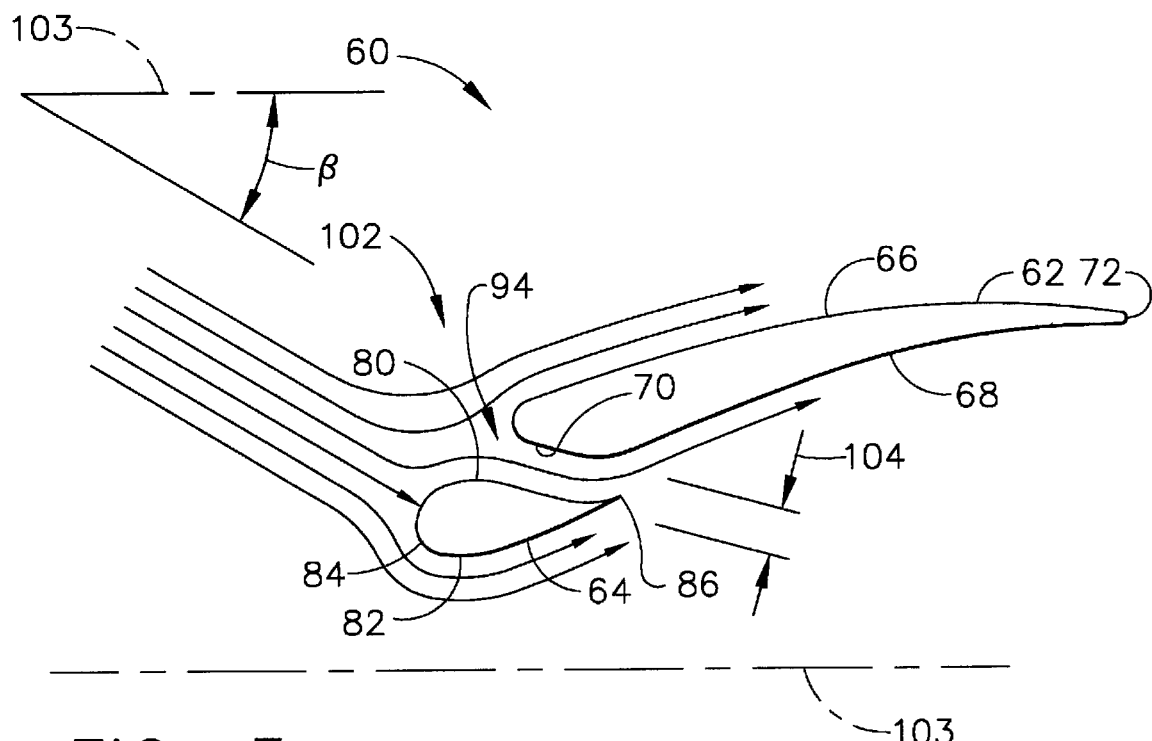
FIG. 3 is a cross sectional view of the guide vane assembly shown in FIG. 2 and illustrates airflow patterns present during a short take-off and vertical landing (STOVL) mode of engine operation.

FIG. 2 is a cross sectional view of a guide vane assembly 60 that may be used to direct airflow towards a gas turbine engine augmentor, such as augmentor 24 shown in FIG. 1. FIG. 2 also illustrates airflow patterns present during a conventional take-off and landing (CTOL) mode of engine operation. FIG. 3 is a cross sectional view of guide vane assembly 60 and illustrates airflow patterns present during a short take-off and vertical landing (STOVL) mode of engine operation. In the exemplary embodiment, guide vane assembly 60 is upstream from augmentor 24 and extends circumferentially within the gas turbine engine. Guide vane assembly 60 includes a plurality of main or core vane portions 62 and nose portions 64.

Each core portion 62 includes a first sidewall 66 and a second sidewall 68. First sidewall 66 is generally convex and defines a suction side of core portion 62, and second sidewall 68 is generally concave and defines a pressure side of portion 62. Sidewalls 66 and 68 are joined at a leading edge 70 and at a trailing edge 72. More specifically, first sidewall 66 is curved and aerodynamically contoured to join with second sidewall 68 at leading edge 70.

Each nose portion 64 includes a first sidewall 80 and a second sidewall 82. Sidewalls 80 and 82 are joined at a contoured leading edge 84 and at a trailing edge 86. Each nose portion 64 is separated from each respective core portion 62 such that a passageway 94 is defined between each respective nose portion 64 and core portion 62. More specifically, in the exemplary embodiment, each nose portion 64 is moveable during engine operation and translates between a first position 100 during CTOL operations, and a second position 102 during STOVL operations in which airflow is supplied to vane assembly 60 at an angle θ measured from that of a nominal swirl 103. In the exemplary embodiment, angle θ is approximately equal to −18°.

When each nose portion 64 is in position 100, passageway 94 is defined with a minimal width 104. Nose portion first sidewall 80 has a contour that substantially mates with a contour of core portion 62. Accordingly, when each nose portion 64 is in position 100, passageway 94 is defined with a minimal width 104. Furthermore, the contour of nose portion sidewall 80 facilitates vane assembly 60 being optimized for CTOL operations in which airflow is supplied to vane assembly 60 at an angle β measured from that of nominal swirl 103. In the exemplary embodiment, angle β is approximately equal to +25°.

During CTOL operations, each nose portion 64 is aerodynamically aligned with respect to each respective core portion 62. More specifically, because each nose portion 64 is contoured to substantially mate with each respective core portion 62, airflow through passageway 94 is facilitated to be substantially minimized or eliminated without requiring passageway 94 to be sealed. Accordingly, when nose portion 64 is in position 100, vane assembly 60 simulates a conventional vane.

During STOVL operations, each nose portion 64 is also aerodynamically aligned with respect to each respective core portion 62, but because nose portion 64 has translated to position 102, airflow is permitted to flow through passageway 94. More specifically, the contouring of nose portion leading edge 84 facilitates increasing a flow capability during STOVL operations. Additionally, because nose portion leading edge 84 is optimized to accept CTOL swirl, nose portion 64 facilitates preventing undue separation in the airflow due to passageway 94. Accordingly, nose portions 64 influence the airflow prior to the air being introduced to core portions 62, and as such each facilitates core portion leading edge 70 accepting less airflow swirl.

In effect, the airflow supplied to vane assembly 60 is preconditioned by nose portion 64. Furthermore, because nose portion 62 is contoured to substantially mate with core portion 62, when translated to position 102, nose portion 64 has a sufficient overlap at trailing edge 86 in comparison to core portion leading edge 70, such that airflow discharged from passageway 94 is substantially parallel to core portion sidewall 68. More specifically, the overlap of nose portion trailing edge 86 induces a coanda effect to airflow discharged from passageway 94 that facilitates attaching the flow to the fixed core portion 62, thus facilitating improving aerodynamic performance of the gas turbine engine.

Accordingly, in the exemplary embodiment, vane assembly 60 is tolerant of a swing in swirl from approximately +25 to −18° from nominal swirl 103. Such a range of swing in swirl is outside the capability of a range of swing in swirl that conventional airfoils can tolerate. As a result, distortion caused by vane assembly 60 is facilitated to be reduced, and as such, airflow entering a diffusing flowpath within augmentor 24 is less distorted. Moreover, because the airflow discharged from vane assembly 60 is less distorted, vane assembly 60 facilitates reducing potentially harmful low velocity wakes or separations within augmentor 24, thus reducing flashback, auto-ignition, stability issues, and/or unpredicted performance losses within augmentor 24.

In an alternative embodiment, nose portions 62 do not translate and are rather fixed in position 102, thus reducing a complexity of vane assembly 60. In this alternative embodiment, during CTOL operations, because nose portion leading edge is optimized to accept CTOL swirl, nose portion 64 facilitates preventing undue separation in the airflow due to passageway 94. Moreover, during CTOL operations, vane assembly 60 accepts or tolerates CTOL swirl because the airflow is initially contracted by nose portion 62 and then accelerated as it is introduced to core portion 60. Such acceleration during CTOL operations generates a static pressure gradient that causes airflow to backflow through a portion of passageway 94, thus facilitating reducing surface deflections caused by passageway 94. Accordingly, in the alternative embodiment, despite fixing a relative position of nose portion 62, vane assembly 60 is tolerant of a swing in swirl from approximately +25 to −18° from nominal swirl.

In a further alternative embodiment, vane assembly 60 includes surface blowing supplied from an alternate air source.

Figure 4:
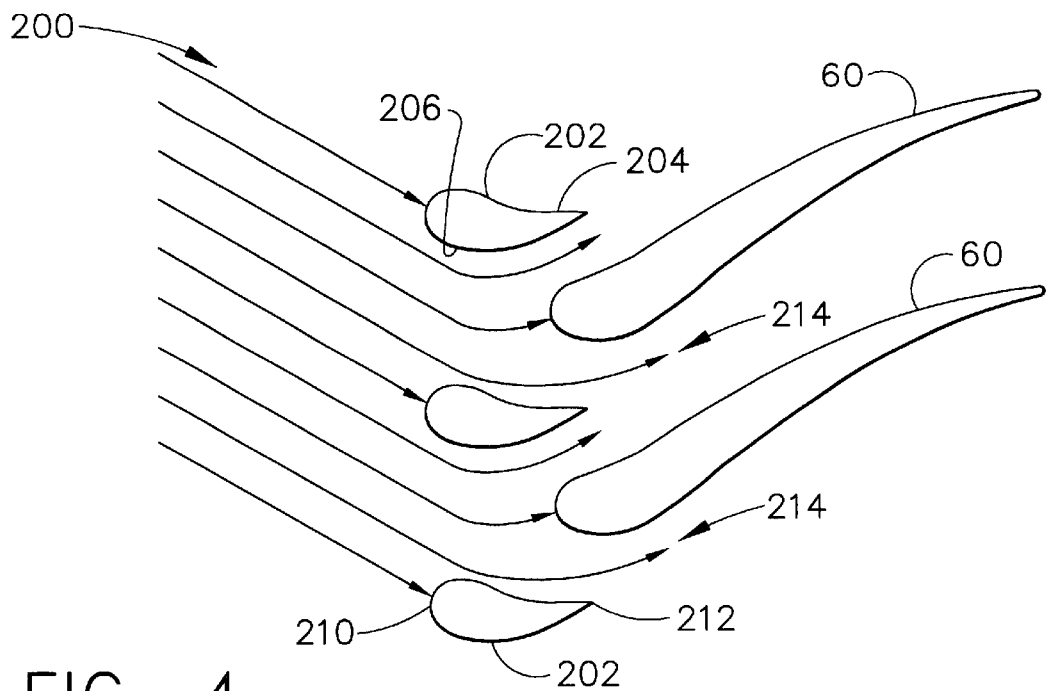
FIG. 4 is cross sectional view of an alternative embodiment of a guide vane assembly that may be used with the gas turbine engine shown in FIG. 1, and illustrates airflow patterns present during a conventional take-off and landing (CTOL) mode of engine operation.
Figure 5:
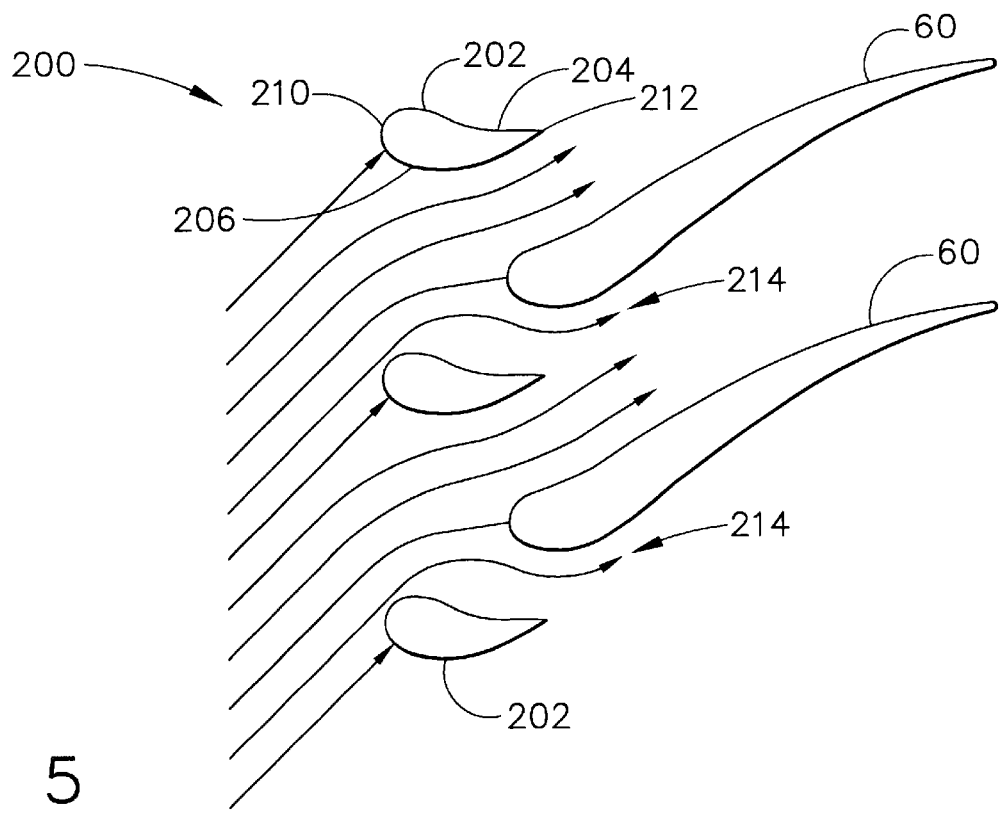
FIG. 5 is a cross sectional view of the guide vane assembly shown in FIG. 4 and illustrates airflow patterns present during a short take-off and vertical landing (STOVL) mode of engine operation

FIG. 4 is a cross sectional view of an alternative embodiment of a guide vane assembly 200 that may be used to direct airflow downstream towards a gas turbine engine augmentor, such as augmentor 24 shown in FIG. 1. FIG. 4 also illustrates airflow patterns present during a conventional takeoff and landing (CTOL) mode of engine operation. FIG. 5 is a cross sectional view of guide vane assembly 200 and illustrates airflow patterns present during a short take-off and vertical landing (STOVL) mode of engine operation. Guide vane assembly 200 is substantially similar to vane assembly 60 shown in FIGS. 2 and 3, and components in vane assembly 200 that are identical to components of vane assembly 60 are identified in FIGS. 4 and 5 using the same reference numerals used in FIGS. 2 and 3. Accordingly, each respective guide vane assembly 200 includes main or core vane portion 62. Guide vane assembly 200 does not include nose portions 60, but rather includes a plurality of known inlet guide vanes 202 that are upstream from each respective core vane portion 62.

Each inlet guide vane 202 includes a first sidewall 204 and a second sidewall 206. First sidewall 204 is generally convex and defines a suction side of vane 202, and second sidewall 206 is generally concave and defines a pressure side of vane 202. Sidewalls 204 and 206 are joined at a leading edge 210 and at a trailing edge 212. More specifically, first sidewall 204 is curved and aerodynamically contoured to join with second sidewall 206 at leading edge 210.

Each inlet guide vane 202 is positioned upstream from each respective main vane portion 62 such that a passageway 214 is defined between each respective inlet guide vane 202 and main vane portion 62. More specifically, each inlet guide vane 202 is positioned such that each inlet guide vane trailing edge 212 radially overlaps each main vane portion leading edge 70.

The above-described guide assemblies include a main vane portion and a secondary vane portion that is upstream from the main vane portion such that a passageway is defined between the vane portions. The passageway enables the vane assemblies to accept a range of swirl swing that is outside the capability of a range of swirl swing that conventional airfoils can tolerate. Accordingly, airflow distortion caused by the vane assembly is facilitated to be reduced downstream from the vane assembly, which facilitates reducing potentially harmful low velocity wakes or separations within the augmentor. As a result, the vane assembly facilitates improving engine performance in a cost-effective and reliable manner.

While the invention has been described in terms of various specific embodiments, those skilled in the art will recognize that the invention can be practiced with modification within the spirit and scope of the claims.

What is claimed is:

1. A method for operating a gas turbine engine to facilitate improving performance of the engine, the engine including an augmentor, said method comprising:

directing airflow towards at least one vane assembly that is upstream from the augmentor and includes a vane first body, a vane second body that is variably positioned with respect to the vane first body during engine operation, and a passageway extending therebetween;

directing airflow into the vane assembly passageway; and discharging the airflow from the vane assembly passageway towards the augmentor.

2. A method in accordance with claim 1 wherein the directing of airflow towards at least one vane assembly further comprises directing the airflow towards the at least one vane assembly including the second body which is positioned to facilitate inducing a Coanda effect to air flowing through the passageway.

3. A method in accordance with claim 1 wherein the directing of airflow towards at least one vane assembly further comprises directing the airflow towards the at least one vane assembly including the second body which is positioned to facilitate reducing airflow separation through said passageway.

4. A method in accordance with claim 1 wherein the directing of airflow towards at least one vane assembly further comprises directing the airflow towards the at least one vane assembly which is configured to tolerate a swing in swirl of greater than approximately 30 degrees.

5. A vane assembly for a gas turbine engine, said vane assembly comprising at least one vane comprising a first body, a second body movable with respect to said first body during engine operation, and a passageway, said first body comprising a first substantially convex sidewall and a second substantially concave sidewall connected at a leading edge, said second body comprising a first sidewall and a second sidewall connected at a leading edge, said second body having a contour that substantially mates with a contour of said first body, said passageway extending between said second body and said first body leading edge.

6. A vane assembly in accordance with claim 5 wherein said vane assembly is configured to tolerate a swing in swirl of greater than approximately 30 degrees.

7. A vane assembly in accordance with claim 5 wherein said passageway has a width measured between said first and second vane bodies, said width being variably adjusted during engine operation.

8. A vane assembly in accordance with claim 5 wherein said vane second body is aerodynamically aligned with respect to said vane first body.

9. A vane assembly in accordance with claim 5 wherein the gas turbine engine includes an augmentor, said vane assembly being located upstream from the augmentor such that air flowing through said vane assembly is discharged into the augmentor.

10. A vane assembly in accordance with claim 5 wherein said vane assembly configured to facilitate reducing distortion losses of air flow through said vane assembly.

11. A vane assembly in accordance with claim 5 wherein said vane assembly passageway configured to induce a Coanda effect to air flowing therethrough.

12. A gas turbine engine comprising:

an augmentor; and a vane assembly comprising at least one vane comprising a first body portion, a second body portion, and a passageway, said first body portion comprising a pair of sidewalls connected at a leading edge, said second body portion comprising a first sidewall and a second sidewall connected at a leading edge, said passageway extending between said second body and said first body leading edge, and configured to discharge air flowing therethrough towards said augmentor, said passageway having a width measured between said vane first and second bodies, said width being variably adjusted during engine operation.

13. A gas turbine engine in accordance with claim 12 wherein said vane assembly is configured to facilitate reducing distortion losses of air discharged towards said augmentor from said passageway.

14. A gas turbine engine in accordance with claim 13 wherein said vane assembly is configured to tolerate a swing in swirl of greater than approximately 30 degrees.

15. A gas turbine engine in accordance with claim 13 wherein said vane assembly passageway is configured to induce a Coanda effect to air flowing therethrough.

16. A gas turbine engine in accordance with claim 13 wherein said vane assembly second body is configured to facilitate reducing separation of air flow within said passageway.

* * * * *

UNITED STATES PATENT AND TRADEMARK OFFICE
CERTIFICATE OF CORRECTION

| | |
|---|---|
| PATENT NO. | : 6,715,983 B2 |
| DATED | : April 6, 2004 |
| INVENTOR(S) | : Koshoffer et al. |

It is certified that error appears in the above-identified patent and that said Letters Patent is hereby corrected as shown below:

Column 6,
Lines 20 and 24, before "configured" insert -- is --.

Signed and Sealed this

Twelfth Day of October, 2004

JON W. DUDAS
*Director of the United States Patent and Trademark Office*